(12) United States Patent
Mix et al.

(10) Patent No.: US 12,332,140 B2
(45) Date of Patent: Jun. 17, 2025

(54) COMPACT SENSOR COMPONENT FOR HARSH ENVIRONMENTS

(71) Applicant: SCHOTT AG, Mainz (DE)

(72) Inventors: Christian Mix, Landshut (DE); Mark Stronczek, Munich (DE); Helmut Hartl, Klosterneuburg (AT)

(73) Assignee: SCHOTT AG, Mainz (DE)

(*) Notice: Subject to any disclaimer, the term of this patent is extended or adjusted under 35 U.S.C. 154(b) by 674 days.

(21) Appl. No.: 17/559,023

(22) Filed: Dec. 22, 2021

(65) Prior Publication Data

US 2022/0113221 A1 Apr. 14, 2022

Related U.S. Application Data

(63) Continuation of application No. PCT/EP2020/066792, filed on Jun. 17, 2020.

(30) Foreign Application Priority Data

Jun. 22, 2019 (EP) .................................. 19181876

(51) Int. Cl.
*G01M 15/10* (2006.01)
*G01N 27/416* (2006.01)

(52) U.S. Cl.
CPC ...... *G01M 15/104* (2013.01); *G01N 27/4162* (2013.01)

(58) Field of Classification Search
CPC .............................................. G01M 15/04–104
See application file for complete search history.

(56) References Cited

U.S. PATENT DOCUMENTS

| | | | |
|---|---|---|---|
| 9,354,215 | B2 | 5/2016 | Schaefer |
| 2002/0000375 | A1 | 1/2002 | Shirai |
| 2005/0022361 | A1 | 2/2005 | Matsuo |
| 2011/0162436 | A1 | 7/2011 | Wahl |
| 2011/0162463 | A1 | 7/2011 | Allen |

(Continued)

FOREIGN PATENT DOCUMENTS

| CN | 104466520 | | 3/2015 | |
|---|---|---|---|---|
| CN | 105130486 A | * | 12/2015 | ......... B23K 35/3033 |

(Continued)

OTHER PUBLICATIONS

DE-102009018908-B4 (Year: 2013).*

(Continued)

*Primary Examiner* — Kristina M Deherrera
*Assistant Examiner* — Fatemeh Esfandiari Nia
(74) *Attorney, Agent, or Firm* — Ruggiero McAllister & McMahon LLC

(57) ABSTRACT

A sensor component for application temperatures above 700° C., especially electrical and/or electrochemical sensor component is provided. The sensor component has a feedthrough element, the feedthrough element having a through-hole with a through-hole inner wall extending from one surface of the feedthrough element to the other surface of the feedthrough element, wherein an insulation element is located within a through-hole of the feedthrough element, the through-hole has a diameter Da, the insulation element has a Volume V and a height H which are compact.

13 Claims, 1 Drawing Sheet

(56) References Cited

U.S. PATENT DOCUMENTS

| | | | |
|---|---|---|---|
| 2015/0052976 A1* | 2/2015 | Schaefer | G01N 33/0027 |
| | | | 73/31.05 |
| 2015/0083487 A1 | 3/2015 | Leedecke | |
| 2016/0049781 A1 | 2/2016 | Nisslbeck | |
| 2016/0133888 A1* | 5/2016 | Hartl | C03C 3/17 |
| | | | 429/179 |
| 2017/0149028 A1* | 5/2017 | Kroll | C03C 4/20 |
| 2017/0291847 A1 | 10/2017 | Fritz | |
| 2018/0190396 A1 | 7/2018 | Brun | |
| 2018/0202914 A1 | 7/2018 | Mattmann | |
| 2019/0006066 A1 | 1/2019 | Suttner | |
| 2021/0265083 A1 | 8/2021 | Mitra | |

FOREIGN PATENT DOCUMENTS

| | | | | |
|---|---|---|---|---|
| CN | 105374475 | | 3/2016 | |
| CN | 107223117 | | 9/2017 | |
| CN | 107851467 | | 3/2018 | |
| CN | 109416962 | | 3/2019 | |
| DE | 60114305 | | 6/2006 | |
| DE | 102011103976 | A1 * | 12/2012 | C03C 29/00 |
| DE | 102009018908 | B4 * | 9/2013 | C03C 17/3417 |
| DE | 102013221692 | | 4/2015 | |
| EP | 3650415 | | 5/2020 | |
| JP | S6352325 | | 4/1988 | |
| JP | 2004226332 | | 8/2004 | |
| JP | 2010101723 | | 5/2010 | |

OTHER PUBLICATIONS

DE-102011103976-A1 (Year: 2012).*
CN-105130486-A (Year: 2015).*
Written Opinion dated Sep. 11, 2020 for PCT/EP2020/066792.
International Search Report dated Sep. 11, 2020 for PCT/EP2020/066792.
International Preliminary Report on Patentability dated Jul. 30, 2021 for PCT/EP2020/066792.
DIN 52326, "Determination of the specific electrical volume resistance", May 1986.
DIN 51730, "Solid Fuel testing—Determination of the ash melting behavior", Sep. 2007.
DIN ISO 7884-8, Glass—Viscosity and viscometric fixed points—Part 8: Determination of (dilatometric) transformation temperature, Feb. 1998.

* cited by examiner

COMPACT SENSOR COMPONENT FOR HARSH ENVIRONMENTS

CROSS REFERENCE TO RELATED APPLICATIONS

This application is a continuation of International Application PCT/EP2020/066792 filed Jun. 17, 2020, which claims the benefit under 35 USC § 119 of European Application 19181876.4 filed Jun. 22, 2019, the entire contents of both of which are incorporated herein by reference.

BACKGROUND

1. Field of the Invention

The invention relates to a sensor component which can be applied in harsh environments, such as at high temperatures, and which is rational to manufacture and which enables a compact sensor design.

2. Description of Related Art

As used in this description, the term sensor component relates to a sensor itself or any part of a complete sensor, which is subject to the present invention. Harsh environments are typically environments in which high temperature occur and which might also comprise aggressive media, such as hot gases with corrosive and/or degrading chemical substances and/or molecules. An example of such harsh environments might be the exhaust systems of combustion engines, for example in vehicles such as automobiles.

In order to efficiently control processes, e.g., within a combustion engine, there is a need for an increased number of sensors and/or a new generation of advanced sensors. Therefore, it is desirable to increase the efficiency of sensor manufacturing as well as to reduce the size of such sensors.

Known solutions of sensor components comprise a feedthrough element which is made of a plurality of parts. Usually there are isolating powders or sintered ceramic parts, which are held in position by metal rings or springs. Such parts require a certain space within the sensor component, which results in relatively large volumes of such sensor components and the space they require when applied to e.g., an exhaust system.

In DE 102013221692 A1 a sensor, especially an oxygen sensor, comprising a powder sealing and further sealing elements is discussed.

Document DE 60114305 T2 discloses a sealing element for a gas sensor comprising a plurality of different sealings.

In U.S. Pat. No. 9,354,215 B2 a metal to ceramic seal is disclosed in which a multi-component gas sensor is held.

A typical application area of the sensors discussed herein are exhaust gas environments or sensors located close to the engine, sensor types like temperature, gas, PM/PN (as used herein for e.g., particle matter), NOx, or soot load sensors. Those most advantageously need to offer long-term mechanical stability.

SUMMARY

The invention especially comprises a feedthrough incorporated within such sensors which allows a much simpler and more compact design.

A sensor component for application temperatures above 700° C., especially electrical and/or electrochemical sensor component is provided. The sensor component has a feedthrough element, the feedthrough element having a through-hole with a through-hole inner wall extending from one surface of the feedthrough element to the other surface of the feedthrough element, wherein an insulation element is located within a through-hole of the feedthrough element, the through-hole has a diameter Da, the insulation element has a Volume V and a height H which are compact.

DETAILED DESCRIPTION

Figure 2:
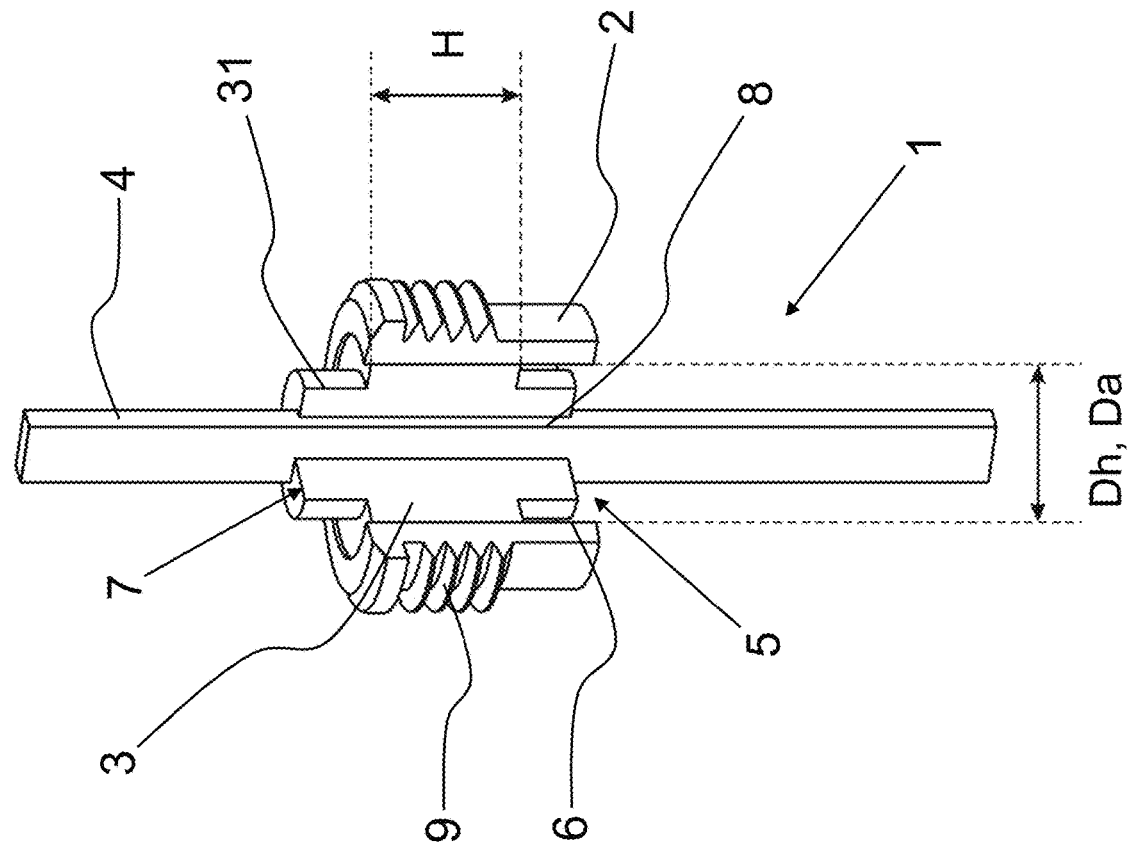
FIG. 2 shows a sensor component according to present application having a one-piece insulation element.

Referring now to FIG. 2, the inventive concept is shown that includes a sensor component 1 with a feedthrough-hole 5, in which an insulation element 3 is located. The insulation element 3 comprises a glass ceramic material which at least forms a joint with the inner wall 6 of the through-hole 5. Of course, one or more functional elements 4 can be located within the insulation element 3 and are fed through the feedthrough-hole 5 in an electrically insulating manner. The area of the sensor component in which the feedthrough-hole 5 is located normally is made of a metal material and/or a ceramic, therefore in most cases is electrically conductive.

The sensor component 1 according to the invention can be used in high temperature applications. Such are applications in which temperatures above 700° C. might occur, or even more than 800° C., or even more than 900° C., especially between 700° C. and 1100° C.

The sensor component 1 is especially an electrical and/or electrochemical sensor component which comprises a feedthrough element 2. The feedthrough element 2 is having a feed through-hole 5 with a through-hole inner wall 6 extending from one surface of the feedthrough element 2 to the other surface of the feedthrough element 2. The through-hole walls 6 can be angled and/or structures, for example in order to increase the pull-out forces of the insulation element 3.

An insulation element 3 is located within a feed through-hole 5 of the feedthrough element 2. The feedthrough-hole 5 has a diameter Dh, and because the insulation element 3 is advantageously joint with the inner wall 6 of the feedthrough-hole 5, the insulation element 3 has an outer diameter Da, an inner diameter Di and a height H, which can define its Volume V. Thus, outer diameter Da of insulation element 3 corresponds to diameter Dh of through-hole 5 and inner diameter Di corresponds to an outer diameter Df of functional element 4.

According to the invention the sensor component is more compact than those in the discussed prior art, allowing dimensions if the insulation element which are chosen from the group consisting of or any combinations thereof:
  H is in the range from 2 to 20 mm, and/or
  Da is in the range from 2 to 30 mm, and/or
  the ratio V/Dh in mm$^2$ is in the range from 0.2 to 100, preferably from 1 to 50, most preferably from 2 to 20, and/or
  the ratio H/Dh is from 0.15 to 1.2, preferably from 0.2 to 1.0, most preferably from 0.4 to 0.8.

How to calculate the volume V of a geometrical body from its dimension height H and diameter (e.g., inner and outer diameters) is commonly known.

In cases the feedthrough element has a height which is higher than the height of the insulation element, H is defined as the height or length if the insulation element which is in contact with the inner wall of the feedthrough-hole.

Commonly, sensor component 1 comprises a functional element 4 which is located within the insulation element 3, such as electrodes for example temperature sensors and/or lambda sensors. Here, insulation element 3 includes a through-hole 7, in which functional element 4 is located. The insulation element 3 comprises a glass ceramic material which at least forms a joint with the inner wall 8 of the through-hole 7. Advantageously, the functional element 4 is fixed and thereby held electrically isolated into place within the insulation element 3.

Of course more than one functional element 4 can be located within the insulation element 3. Furthermore, the insulation element 3 or elements 3 are advantageously at least in areas joint with the insulation element 3.

As said before, the insulation element 3 has an outer diameter Da which corresponds to the diameter Dh of the feedthrough-hole 5. The functional elements 4 claim space within the insulation element 3, which thereby has an inner diameter Di which corresponds to the diameter of the at least one functional element 4 or to the sum of diameters of the functional elements 4, if more than one is present. This functional element 4 may have a rectangular or circular cross-sectional area and could me made of an insulating multi-layer component as used e.g., for gas sensors.

In such embodiments, the dimensional ranges are according to the invention chosen to be:

Di is in the range from 0.2 to 15 mm, and/or

Da is in the range from 1 to 25 mm.

In the inventive sensor component 1, the insulation element 3 is joint with the feedthrough element 2, preferably with at least areas of the inner wall 6 of the feed through-hole 5. This means that there is bond between the jointing area of the feedthrough element 2 and the insulation element 3, which can be a physical and/or a chemical bond. This can be achieved by a thermal manufacturing method, in which the insulation element is advantageously glassed into and/or sintered into the through-hole of the feedthrough-element.

In case the feedthrough element 2 is made of a metal, the thermal expansion of the insulation element 3 can be chosen to be smaller than the thermal expansion of the feedthrough element 2, so that during the cooling down of the feedthrough element 2 with the enclosed insulation element 3, the feedthrough element 2 so to say shrinks onto the insulation element 3 and thereby exerts a compressive stress on the insulation element 3, forming a compression seal. The compression seal provides good tightness and higher pull-out forces.

In a preferred embodiment, the insulation element 3 comprises a glass ceramic material. Most advantageously, the main area or with other words, the majority of the volume of the insulation element, is a glass ceramic material.

A glass ceramic material is according to the known scientific definitions a material which origins from a glass material (or precursor glass), which is transformed via a temperature processing into a material which also comprises crystal phases and/or at least an increased volume of crystal phases. The crystallite phases can reach above 90% of the overall volume, or even above 95% and/or 98% and/or 99%.

In the scope of the present disclosure, a glass ceramic material may also be denoted an at least partially crystallized glass. The glass ceramic or the at least partially crystallized glass may be obtained via crystallization, preferably a controllable crystallization, more preferably a controlled crystallization, so as to obtain a structure in which a preferably narrow spread is resulting for the spatial dimension of the crystals or crystallites which can be assigned to the same crystal phase and/or a preferred spatial arrangements of crystals or crystallites may be achieved. The precursor glass from which the at least partially crystallized glass (or glass ceramic) may be obtained may also be denoted a crystallizable glass.

As a result of crystallization, a crystallizable glass thus becomes an at least partially crystallized glass, i.e., a glass with a proportion of crystal phases of more than 0.1% by volume. Such an at least partially crystallized glass which comprises at least one crystal phase and optionally a glassy phase, for example an at least partially crystallizable glass or a residual glass phase.

According to an embodiment, the proportion of the residual glass phase in the at least partially crystallized glass is less than 10%, preferably less than 5%, by volume. The at least partially crystallized glass comprises aggregates of crystals. These aggregates of crystals are formed of a multitude of crystals or crystallites. The shape of the crystallites may be needle-like or thread-like or platy, for example. Preferably, the crystallites may be arranged radially, that is, radiating outwards from a central point, (for example spherolithic of in the shape of a fan), blade-like or plate-like crystals or crystallites may be arranged so as to interpenetrate each other as well as the residual glass phase and/or the at least partially crystallized glass.

According to a further embodiment, the crystallizable glass and/or the least least partially crystallized glass comprises the following components in mol-% on an oxide basis:

$La_2O_3$ more than 0.3 mol-% to less than 5 mol-%, preferably less than or equal to 4.5 mol-%, more preferably less than or equal to 4 mol-%, $Nb_2O_5$ 0 mol-% to 9 mol-%, $Ta_2O_5$ 0 mol-% bis 7 mol-%, wherein $\Sigma(A_2O_5)$ is more than 0.2 mol-% to 9 mol-%, wherein A refers to an element usually having oxidation state V+ in oxides and comprises and/or may comprise Nb or Ta or P or any combinations thereof, for example.

It has been found that a very reliable and/or temperature stable joint may be formed by adding a suitable amount of oxides $La_2O_3$, $Ta_2O_5$ and/or $Nb_2O_5$ and optionally further oxides $A_2O_5$. As noted above, A refers to an element usually having oxidation state V+ in oxides. However, it is understood that not all atoms "A" comprised by the at least partially crystallized glass need actually be present in the same oxidation state.

In the scope of the present disclosure, oxides $La_2O_3$, $Nb_2O_5$ and $Ta_2O_5$ and optionally further oxides $A_2O_5$ comprised by the at least partially crystallized glass are also denoted as "glass-matrix forming oxides", meaning that at least during the first stage of crystallization, these oxides remain in the residual glassy phase, thus forming a glassy matrix.

The crystallisable or at least partially glass may further comprise $Bi_2O_3$ or $P_2O_5$. However, these components are disadvantageous if a high temperature stability of the feedthrough is to be achieved. Therefore, according to a further embodiment, the glass, except as impurities present in amounts of less than 500 ppm each, contains none of the oxides of bismuth and/or phosphorus. In this case, ppm refers to mass fraction.

According to a further embodiment, the glass, except as impurities present in amounts of less than 500 ppm each, contains none of the oxides of alkaline metals and/or boron. This is advantageous, as these components are detrimental in terms of temperature stability. Further, these components may lead to the formation of undesirable crystal phases with low thermal expansion. Furthermore, alkaline oxides may lead to an undesirable low electrical resistance of the at least partially crystallized glass.

According to an embodiment, the glass comprises an oxide RO, wherein
Σ(RO) is less than or equal to 55 mol-%
wherein R is an element usually having oxidation state II+ in oxides, and may for example comprise Ca, Mg, Zn or any combinations thereof.

In other words, RO encompasses alkaline earth oxides as well as ZnO. According to a preferred embodiment, the glass, except as impurities present in amounts of less than 500 ppm each, contains none of the oxides of BaO and/or SrO, in order to avoid undesirable reactions between the glass and joining partners comprising chromium, for example, chromium containing steel or the like.

According to an embodiment, the glass comprises, in mol-% on an oxide basis,
$SiO_2$ 30 mol-% to 40 mol-%,
$Al_2O_3$ 3 mol-% to 12 mol-%,
CaO 32 mol-% to 46 mol-%,
MgO 5 mol-% to 15 mol-%,
ZnO 0 mol-% to 10 mol-%,
and optionally
$ZrO_2$ 0 mol-% to 4 mol-%, preferably at most 3 mol-%, and/or
$TiO_2$ 0 mol-% to 4 mol-%, preferably at most 3 mol-%, and/or
$MnO_2$ 0 mol-% to 5 mol-%.

Optionally, according to an embodiment, the glass may further comprise $TiO_2$, $ZrO_2$, $MnO_2$ and any combinations thereof. However, the content of these components is limited. In particular, $TiO_2$ and $ZrO_2$ known seed materials for crystallization, are not essential in the glass. Further, these components may lead to the formation of undesired crystal phases with low thermal expansion.

According to a further embodiment, the glass may comprise between at least 35 mol-% CaO and at most 46 mol-% CaO, preferably at least 35 mol-% and less than 43.5 mo.-% and/or between at least 5 mol-% MgO and less than 13 mol-% MgO.

According to an embodiment, the crystallizable or at least partially crystallized glass comprises in particular $SiO_2$ and CaO and MgO and $Al_2O_3$ and optionally ZnO.

In the quaternate system $SiO_2$—$Al_2O_3$—CaO—MgO crystal phases with high coefficient of thermal expansion may be obtained, for example mixed crystals of calcium-magnesium-silicates with high CaO-content, like Akermanite, and/or merwinite, that may form mixed crystals also with $Al_2O_3$-containing phases like gehlenite and/or augite. Further, if as an additional component the glass comprises ZnO, harystonite may be present as well.

According to an embodiment, the glass is present and is an at least partially crystallized glass comprising crystals or crystallites of CaO—MgO-silicates with high CaO-content, in particular meso- and/or sorosilicates. Nesosilicates are silicates comprising isolated $SiO_4$-tetrahedra, whereas sorosilicates are silicates comprising double tetrahedral joined at a bridging oxygen atom, resulting on structural element $Si_2O_7$. Nesosilicates may be merwinite $Ca_3Mg(SiO_4)_2$ and/or a mixed crystal with merwinite-like crystal structure. Further, the glass may additionally or alternatively comprise o sorosilicate, like Åkermanit $Ca_2MgSi_2O_7$ oder gehlenite $Ca_2Al[AlSiO_7]$ or mixed crystals thereof. Furthermore, according to an embodiment, the glass may comprise crystal phases with an augite or augite-like structure.

In the scope of the disclosure, mixed crystal refers to a crystal whose chemical composition does not exactly correspond to the stoichiometric composition of a compound. For example, when reference is made to an "akermanite mixed crystal", it is to be understood that the chemical composition of the mixed crystal does not correspond to $Ca_2MgSi_2O_7$. The mixed crystal may comprise more Ca than according to the stoichiometric composition, or that Zn replaces Ca at least partially. However, the crystal structure of the mixed crystal will correspond predominantly to that of akermanite, even if small deviations may occur with respect to lattice constants, for example.

According to an embodiment, the glass is present and is an at least partially crystallized glass comprising CaO—Mg-silicates rich in CaO, in particular CaO—Mg-nesosilicates and/or sorosilicates rich in CaO, like merwinite and/or mixed crystals with a merwinite-like structure and additionally or alternatively a crystal phase with melilite-structure, like akermanite $Ca_2MgSi_2O_7$ and/or gehlenite $Ca_2Al[AlSiO_7]$ and/or mixed crystals thereof, and/or crystal phases with augite-structure Exemplary compositions of crystallizable of at least partially crystallized glasses are given in the following table. Here, compositions are given in mol-% on an oxide basis. Temperatures used for characterization of fusibility of solid ashes, such as softening temperature (SofT), sintering temperature (SinT), sphere temperature (Sph), half-sphere temperature (hsph) and melting/fusion temperature (melt) were determined using a heating microscope (HM). Determination of these temperatures was done in accordance with or on the basis of DIN 51730. The linear coefficient of thermal expansion (CTE or α) is given in units of $10^{-6}$/K. Indexes indicate the temperature range for which the CTE has been determined. Further, $T_g$ refers to the glass transition temperature according to ISO 7884-8 that is determined by the point of intersection of the tangents to the two branches of the expansion curve when measuring with a heating rate of 5 K/min. The softening point of the glass ($E_w$) is defined as the temperature at which the glass has a viscosity of $10^{7.6}$ dPa s, measured in accordance with or on the basis of ISO 7884-3. $t_{k\ 100}$ indicates the temperature at which the crystallizable has a specific electrical resistivity of $10^8$ Ω·cm and is preferably determined in a method according to or on the basis of DIN 52326.

TABLE 1

| Compositions of exemplary glasses | | | | | | | | |
|---|---|---|---|---|---|---|---|---|
| Example no. | 1 | 2 | 3 | 4 | 5 | 6 | 7 | 8 |
| $SiO_2$ | 36 | 34 | 36 | 34 | 34 | 38 | 35 | 35 |
| $Al_2O_3$ | 7 | 6 | 7 | 6 | 9 | 5 | 7.7 | 7 |
| $B_2O_3$ | | | | | | | | |

TABLE 1-continued

Compositions of exemplary glasses

|  |  |  |  |  |  |  |  |  |
|---|---|---|---|---|---|---|---|---|
| TiO$_2$ | | | | | | | | |
| MnO$_2$ | | | | | | | | |
| ZrO$_2$ | 2 | | | | | | | |
| P$_2$O$_5$ | | | | | | | | |
| Bi$_2$O$_3$ | | | | | | | | |
| La$_2$O$_3$ | 2 | 2 | 2 | 4 | 1 | 2 | 2.6 | 2.2 |
| Nb$_2$O$_5$ | 6 | | 3 | | 2 | 1 | 0.2 | 0.6 |
| Ta$_2$O$_5$ | | 4 | | 2 | | | 0.3 | 0.6 |
| Y$_2$O$_3$ | | | | | | | | |
| R$_2$O | | | | | | | | |
| ZnO | | 6 | | 4 | | 2 | 3 | 3.3 |
| MgO | 9 | 10 | 10 | 10 | 11 | 10 | 12.2 | 10.3 |
| CaO | 38 | 38 | 42 | 40 | 43 | 42 | 39 | 41 |
| SrO | | | | | | | | |
| BaO | | | | | | | | |
| Σ | 100 | 100 | 100 | 100 | 100 | 100 | 100 | 100 |
| Σ (RO) | 47 | 54 | 52 | 54 | 54 | 54 | 54.2 | 54.6 |
| CaO + MgO | 47 | 48 | 52 | 50 | 54 | 52 | 51.2 | 51.3 |
| Σ (R$_2$O$_3$ + A$_2$O$_5$) | 8 | 6 | 5 | 6 | 3 | 3 | 3.1 | 3.4 |
| Σ (A$_2$O$_5$) | 6 | 4 | 3 | 2 | 2 | 1 | 0.5 | 1.2 |
| CaO/MgO | 4.22 | 3.80 | 4.20 | 4.00 | 3.91 | 4.20 | 3.20 | 3.98 |
| Temperates [° C.] | | | | | | | | |
| HM: SinT | | 767 | 772 | 772 | 770 | 762 | 765 | 770 |
| HM: SofT | | 890 | 925 | | 922 | 811 | | |
| Sph | | 1282 | 1259 | | 1304 | | | |
| Hsph | 1198 | 1289 | 1265 | | 1320 | 1298 | 1340 | 1320 |
| Crystallizable glass | | | | | | | | |
| α (20; 300° C.) | 8.28 | 8.33 | 8.8 | 8.81 | 8.46 | 8.72 | 8.47 | 8.64 |
| α (20; 700° C.) | 9.24 | 9.43 | 9.81 | 9.8 | 9.42 | 9.88 | 9.63 | 9.65 |
| T$_g$ [° C.] | 752 | 743 | 754 | 737 | 753 | 741 | 739 | 734 |
| Ew [° C.] | | | 877 | | 883 | 873 | 878 | 875 |
| Density [g/cm$^3$] | 3.43 | 3.77 | 3.27 | 3.64 | 3.13 | 3.22 | 3.28 | 3.32 |
| t$_k$100 [° C.] | 572 | 596 | 588 | | 604 | 593 | 611 | 606 |
| Young's modulus [GPa] | | | 107 | | 107 | 105 | 107 | 106 |
| Crystallized glass Crystallization at 1000° C./20 min | | | | | | | | |
| α (20; 700° C.) | 8.7 | 9.3 | 10.9 | 9.9 | 9.3 | 9.6 | 9.96 | 9.3 |
| α (20; 1000° C.) | 9.4 | 9.55 | 11.1 | 10.15 | 9.6 | 9.66 | 10.23 | 9.7 |
| Crystallization at 1040° C./200 min | | | | | | | | |
| α (20; 700° C.) | 10.53 | 9.2 | 10.3 | 9.7 | 9.7 | 10.2 | 9.25 | 10.15 |
| α (20; 1000° C.) | 10.25 | 9.55 | 10.75 | 10 | 9.65 | 10.35 | 9.15 | 10.2 |

| Example no. | 9 | 10 | 11 | 12 | 13 | 14 | 15 | 16 |
|---|---|---|---|---|---|---|---|---|
| SiO$_2$ | 33.2 | 34.5 | 35 | 36 | 35.3 | 36.8 | 36.4 | 35 |
| Al$_2$O$_3$ | 10 | 6.6 | 6 | 8 | 7.7 | 6.6 | 8 | 6.6 |
| B$_2$O$_3$ | | | | | | | | |
| TiO$_2$ | | | | 2 | | | | |
| MnO$_2$ | | | 2 | | | | | |
| ZrO$_2$ | | | | | 1.2 | 0.3 | | |
| P$_2$O$_5$ | | | | | | | | |
| Bi$_2$O$_3$ | | | | | | | | |
| La$_2$O$_3$ | 1.7 | 2.2 | 3 | 2.4 | 3 | 2.6 | 2.8 | 2.4 |
| Nb$_2$O$_5$ | 1.2 | 1.6 | 2 | | 0.8 | 0.3 | 0.6 | 0.6 |
| Ta$_2$O$_5$ | 0.5 | 0.1 | | 0.3 | | | 0.4 | 0.4 |
| Y$_2$O$_3$ | | | | | | | | |
| R$_2$O | | | | | | | | |
| ZnO | 3 | 2 | | 1 | 1 | | 1.4 | 6.4 |
| MgO | 8.2 | 10 | 10 | 11.8 | 10 | 10.8 | 11.8 | 10.6 |
| CaO | 42.2 | 43 | 42 | 38.5 | 41 | 42.6 | 38.6 | 38 |
| SrO | | | | | | | | |
| BaO | | | | | | | | |
| Summe | 100 | 100 | 100 | 100 | 100 | 100 | 100 | 100 |
| Σ (RO) | 53.4 | 55 | 52 | 51.3 | 52 | 53.4 | 51.8 | 55 |
| CaO + MgO | 50.4 | 53 | 52 | 50.3 | 51 | 53.4 | 50.4 | 48.6 |
| Σ (R$_2$O$_3$ + A$_2$O$_5$) | 3.4 | 3.9 | 5 | 2.7 | 3.8 | 2.9 | 3.8 | 3.4 |
| Σ (A$_2$O$_5$) | 1.7 | 1.7 | 2 | 0.3 | 0.8 | 0.3 | 1 | 1 |
| CaO/MgO | 5.15 | 4.30 | 4.20 | 3.26 | 4.10 | 3.94 | 3.27 | 3.58 |
| Temperatures [° C.] | | | | | | | | |
| HM: SinT | 770 | 762 | 760 | 761 | | | 762 | |
| HM: SofT | | | | | | | | |

TABLE 1-continued

| Compositions of exemplary glasses | | | | | | | | |
|---|---|---|---|---|---|---|---|---|
| Sph | 1308 | 1270 | 1313 | 1290 | | | 1295 | |
| Hsph | 1320 | 1279 | 1318 | 1300 | | | 1299 | |
| Crystallizable glass | | | | | | | | |
| α (20; 300° C.) | 8.4 | 9.05 | 8.94 | 8.5 | 8.7 | 8.9 | 8.5 | 8.6 |
| α (20; 700° C.) | 9.4 | 10 | 10.04 | 9.53 | 9.62 | 9.84 | 9.57 | 9.8 |
| $T_g$ [° C.] | 749 | 749 | 747 | 746 | 754 | 757 | 747 | 726 |
| Ew[° C.] | 880 | 875 | 880 | 878 | 891 | 900 | 884 | 862 |
| Density | | | | | | | | |
| [g/cm$^3$] | 3.26 | 3.28 | 3.35 | 3.23 | 3.29 | 3.2 | 3.29 | 3.37 |
| $t_k$100[° C.] | 616 | 598 | 590 | 606 | 607 | 609 | 609 | 607 |
| Young's modulus [GPa] | 106 | 106 | 107 | 107 | | | | |
| Crystallized glass | | | | | | | | |
| Crystallization at 1000° C./20 min | | | | | | | | |
| α (20; 700° C.) | 10.6 | 10.75 | | 10.55 | | 10.7 | | 10.2 |
| α (20; 1000° C.) | 11.1 | 11.1 | | 11.1 | | 11 | | 10.2 |
| Crystallization at 1040° C./200 min | | | | | | | | |
| α (20; 700° C.) | 9.5 | 10 | 9.55 | | 10.3 | 10.4 | 9.4 | |
| α (20; 1000° C.) | 9.65 | 9.7 | 9.7 | | 10.1 | 10.3 | 9.6 | |

Normally the glass ceramic material has a higher overall melting temperature than its glass origin, allowing the sensor component to be exposed to higher temperature than its production temperature. In a most advantageous embodiment, the glass ceramic material has crystallite phases which form a structure, in which individual crystals are limited in movement also when the glass phase becomes viscous and/or even liquid.

Compared to the prior art, the invention provides furthermore the advantage to preferably provide a glass ceramic material of the insulations element which has a closed surface, preferably a glassy surface. This means that there is a thin layer of the glass phase on the outer surface of the insulation element. For example, it can be seen that in embodiments there is a gradient in the crystallite structure from the surface towards the inner volume of the insulation element, in which the individual structure vary and/or the amount of volume the crystallites take within the overall structure is increasing. Such gradients are beneficial for forming the joint between the feedthrough element and the insulation element.

The glassy layer and/or crystallite gradient also advantageously provides a closed surface, which means that the surface has no open pores, except of course random imperfections, which are not relevant for the performance of the sensor component. Even if the insulation element might comprise pores within its volume, there is a gradient in pores with essentially no pores at the surfaces and possible pores within the volume of the insulation element. The closed surface has the advantage, that contaminating substances such as residuals within exhaust gases are less likely to adhere to the surface, which contributes to the reliability of the overall sensor component.

Further, it has been found that the high viscosity of the at least partially crystallized glass at high temperatures allows for joining angular components, especially for angular functional elements, to be reliably joined to a feedthrough element with standard circular or nearly circular cross section. That is, even a functional element with angular cross section, like a square cross section, may be joined using glasses according to the disclosure without the occurrence of cracks.

This has not been possible so far, as upon joining of angular-shaped functional elements to circular-shaped feedthrough elements, high stresses will result in the regions of the corners of the angular-shaped functional element, thus leading to crack formation. However, this can be avoided by using the glasses according to embodiments of the disclosure. Additionally, applying a mechanical load may further help to realize a crack-free joining of angular-shaped components in a circular shaped feedthrough element. It is assumed that a high content of crystals, preferably crystals and crystallites forming aggregates that interpenetrate each other, as described above, and, thus, a high amount of grain boundaries, impedes a transfer of tension, thus enabling a crack-free joint.

Further, is has been found that with glasses according to the disclosure, chemical bonds form at the interface between joining partners and the glass. This chemical bonding at the interfaces between the joining partners, that is, the feedthrough element(s) and/or the functional element(s) on the one hand and the glass on the other hand leads to a very stable joint, with the result that high forces need to be applied in order to pull out the functional element. Inventors assume that by using glasses according to the disclosure as insulation element material (that may also be denoted a "joining material"), pull out forces may be up to ten times higher compared to pull out forces observed for standard joints using pressed ceramic powder as joining material. In the scope of the disclosure, functional element(s) and/or feedthrough element(s) may also be called "joining partner (s)".

For inner diameters Di of the insulation element 3 of 6 mm or more and an outer diameter Da of the insulation element 3 of 10 mm or more, pull out forces of up to 10 kN could be achieved surprisingly for feedthroughs according to embodiments of the present disclosure using steel 1.4762 as material for the functional element. This may be achieved by carefully selecting and/or matching the coefficients of thermal expansion of feedthrough element, insulation element and functional element.

According to an embodiment, therefore, the absolute value of the differences between the thermal expansion coefficients of a joining partner material and an insulation element material is $5*10^{-6}$/K or less, preferably $3*10^{-6}$/K or less and more preferably $1*10^{-6}$/K or less.

According to this very advantageous embodiment, the joint and, thus, the sensors may withstand very high temperatures of up to 1000° C. and even more.

Inventors assume that the high temperature resistance of the joint according to embodiments of the disclosure may be due to the presence of interpenetrating crystals and crystal aggregates and the texture of the at least partially crystallized glass thus achieved. Inventors further believe that due to this very advantageous structure of the at least partially crystallized glass, even softening of an optional residual glass phase at high temperatures may be made up for.

The sensor component according to the invention can advantageously be a one-piece part, preferably made of a single material component or from a plurality of single material components which are joint together to form an one-piece part. A one-piece part can only be taken apart by destructing the insulation element.

It is also provided for, that the insulation element 3 has a surface with structures which enhance the surface area, preferably at least an element 31 for increasing the surface are. Such can be elevated and/or impressed structure and/or even angled surfaces. If in the use of the sensor component 1 substances are layered and/or condensed onto the surface of the insulation element 3, such can reduce the precision of the sensor measurement and/or eventually result into a short circuit of the insulation element. The said structures 31 prevent such short circuits and/or even prevent the deposition of such layers by shadowing effects. It can also be considered to provide the described structures 31 with edges, for example sharp edges or edges with small edge radii, in order to break depositing layers at those edges. When calculating the volume V, those structures are not taken into account.

Figure 1:
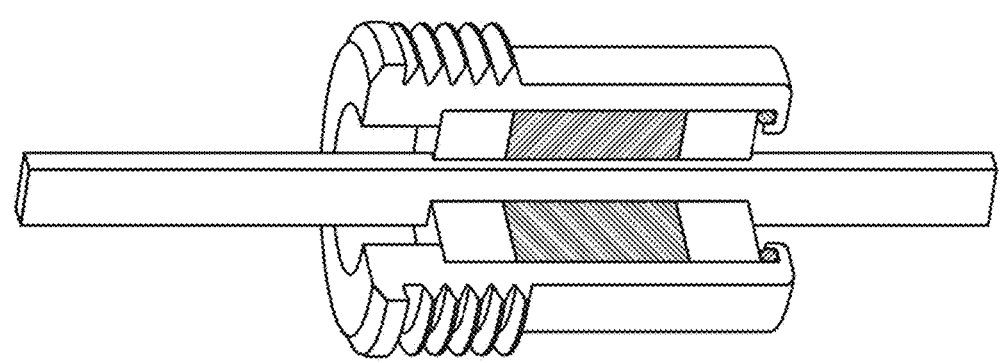
FIG. 1 shows a known sensor component according to the prior art.

The invention and its practical realization can be demonstrated by the comprised figures. FIG. 1 shows a known sensor component according to the prior art. It can be clearly seen that the insulation element is comprised of various parts.

FIG. 2 shows the sensor component 1 according to the invention. The insulation element 3 is a one-piece part.

Examples produced have the sizes and ratios of insulation element dimensions as enclosed in the following table.

| D (mm) | 2 | 4 | 6 | 8 | 12 | 4 | 8 | 12 | 20 | 24 |
|---|---|---|---|---|---|---|---|---|---|---|
| Da (mm) | 1 | 2 | 4 | 5 | 8 | 3 | 6 | 8 | 12 | 16 |
| Di (mm) | 0.5 | 1 | 2 | 2.5 | 5 | 0.7 | 3 | 4 | 8 | 8 |
| H (mm) | 2 | 2 | 2 | 2 | 2 | 4 | 4 | 4 | 4 | 8 |
| H/D | 1 | 0.5 | 0.33 | 8 | 0.16 | 1 | 0.5 | 0.33 | 0.2 | 0.16 |
| V (mm$^3$) | 1.2 | 4.7 | 18.9 | 29.4 | 61.3 | 26.7 | 84.8 | 150.8 | 251.3 | 1206.4 |
| V/D (mm$^2$) | 0.6 | 1.2 | 3.2 | 3.7 | 5.1 | 6.7 | 10.6 | 12.6 | 12.6 | 50.3 |

The functional element 4 is located within the insulation element 3, preferably being at least in areas joint with the insulation element 3, so that the insulation element 3 has an outer diameter Da of the feedthrough-hole and an inner diameter Di which corresponds to the diameter of the at least one functional element 4. D is the outer diameter of the feedthrough element 2.

The feedthrough element 2 is in embodiments made of metal or ceramics. Suitable metals may be steels, such as standard steels, stainless steels, rustproof steels, and high-temperature stable ferritic steels, which are also known under the brand name Thermax, for example Thermax 4016, Thermax 4742, or Thermax 4762, or Crofer 22 APU or CroFer 22 H, or NiFe-based materials, e.g., NiFe45, NiFe47, or nickel plated pins, or known under the brand name Inconel, for example Inconel 718 or X-750, or steels such as known under the designations CF25, Alloy 600, Alloy 625, Alloy 690, SUS310S, SUS430, SUH446, or SUS316, or austenitic steels such as 1.4828 or 1.4841. Therefore, the feedthrough element can advantageously be composed of ferritic highly-corrosion resistant steel, advantageously: 1.4742, 1.4755, 1.4760, 1.4762, and/or Inconel steel (Alloy 600, Alloy 601, Alloy 625, X-750) and/or stainless steel. Further, the feedthrough element may comprise or consist of a high-temperature stable ceramic compound such as an alumina-based ceramic or a zirconia-based ceramic, for example a ceramic comprising Y-stabilized zirconia or ceramics such as $Al_2O_3$, $ZrO_2$, forsterite, YSZ.

The functional element 4 can be essentially a pin and/or an electrical conductor and/or a sensing element and can be essentially made of or comprise, especially in the area of the insulation element, a steel, such as a standard steel, stainless steel, rustproof steels and high-temperature stable ferritic steel, like steels knowns under the brand name Thermax, for example Thermax 4016, Thermax 4742, or Thermax 4762, or Crofer 22 APU or CroFer 22 H, or NiFe-based materials, e.g., NiFe45, NiFe47, or nickel plated pins, or known under the brand name Inconel, for example Inconel 718 or X-750, or steels such as known under the designations CF25, Alloy 600, Alloy 625, Alloy 690, SUS310S, SUS430, SUH446, or SUS316, or austenitic steels such as 1.4828 or 1.4841, or ferritic highly-corrosion resistant steel such as 1.4742, 1.4755, 1.4760, 1.4762 and/or Kanthal heat wires. Further, the functional element may comprise or consist of a high-temperature stable ceramic compound such as an alumina-based ceramic or a zirconia-based ceramic, for example a ceramic comprising Y-stabilized zirconia or and/or ceramics such as $Al_2O_3$, $ZrO_2$, forsterite, YSZ (yttrium-stabilized zirconia).

As can be seen by the foregoing description and the description in its entirety, the inventive sensor component 1 is more compact than the multi piece sensor components presently used. Therefore the invention also allows to reduce the outer form factor of the overall sensor component. Such sensor component 1 can be provided with an outer threading 9 adapted to mount the sensor component to other elements or devices, such the exhaust system, for example the exhaust pipes, of an combustion engine. According to the invention, the outer threading 9 advantageously has a diameter which is smaller than 14 mm. In means of standard measuring of and tooling for threading, the outer threading can be smaller than M14, preferably it is in the range from M14 to M6. This allows to increase the number of sensor components 1 within an exhaust system and/or to move the sensor components 1 into areas, in which there is only limited space because of other components or structures of a combustion engine.

The sensor component 1 according to the invention can be beneficially used for measuring exhaust gases of a combustion engine. They are preferably used as lambda sensor and/or NOR sensor and/or particle matter sensor and/or temperature sensor.

The benefits of the invention contribute to improved fuel economy and can help to allow combustion engines to comply with stricter emission standards such as EURO 6. The need for innovative engine-management systems and intelligent exhaust-treatment technologies will increase further with the likely introduction of EURO 7. Not only will there be more and more sophisticated sensors, but they need to perform reliably in extreme temperatures and corrosive environments. The inventive sensor components provide superior robustness, while also offering more rational manufacturing methods and reduced design complexity.

Exposed to exhaust gas environments or located close to the engine, sensor types like temperature, gas, PM/PN, NOR, or soot load sensors need to offer long-term mechanical stability in corrosive, ultra-high temperature conditions. In exhaust gas applications for example, sensors need to maintain good performance in temperature cycling conditions up to 950° C. for at least 50.000 cycles. Those requirements can be met with the sensor components according to the invention.

They are also extremely temperature and corrosion resistant, for example to diesel and/or gasoline exhaust gases and chemicals, such as AdBlue.

As further advantage, no interface materials are needed to form a direct seal of the insulation element and the feedthrough element.

Due to the reduced volume the insulation element has according to the invention, the overall sensor component heats up or cools down faster than the sensor component according to the prior art, this means that the thermal equilibrium is reached faster.

LIST OF REFERENCE NUMERALS 1 sensor component
2 feedthrough element
3 insulation element
4 functional element
5 feedthrough-hole
6 inner wall
7 through-hole
8 through-hole inner wall
9 outer threading
31 element for increasing surface area
D is the outer diameter of the feedthrough element
Dh diameter of the feedthrough-hole
Da outer diameter of insulation element
Di inner diameter of insulation element
Df outer diameter of the functional element
H height of insulation element
V volume of insulation element

What is claimed is:

1. A sensor component for application temperatures above 700° C., comprising:
   a feedthrough element made of metal, the feedthrough element having a through-hole with a through-hole inner wall;
   an insulation element in the through-hole of the feedthrough element, the insulation element being joined with the feedthrough element so that there is a physical and/or a chemical bond between the insulation element and the through-hole inner wall,
   wherein the feedthrough element has a first outer diameter (D),
   wherein the insulation element has a second outer diameter (Da), a volume (V), and a height (H),
   wherein the through-hole has a diameter (Dh) that corresponds to the second outer diameter (Da),
   wherein the first outer diameter (D), the diameter (Dh), the second outer diameter (Da), the volume (V), and the height (H) have dimensions selected from a group consisting of: the height (H) from 2 to 20 mm, the first outer diameter (D) from 2 to 30 mm, a ratio of V/D from 0.2 to 100, a ratio of V/D from 1 to 50, a ratio of V/D from 2 to 20, a ratio H/D from 0.15 to 1.2, a ratio H/D from 0.2 to 1.0, a ratio H/D from 0.4 to 0.8, and any combinations thereof, and
   wherein an extension portion of the insulation element has an outer diameter that is less than the through-hole diameter (Dh) of the feedthrough element so that a gap is formed between the inner wall of the through-hole and the extension portion of the insulation element.

2. The sensor component of claim 1, further comprising a second through-hole in the insulation element; and
   a functional element in the second through-hole, the insulation element being joined with the functional element so that there is a physical and/or a chemical bond between the insulation element and the functional element.

3. The sensor component of claim 2, wherein the functional element comprises a plurality of functional elements.

4. The sensor component of claim 2, wherein the functional element has a third outer diameter (Df) and the insulation element has an inner diameter (Di), wherein the inner diameter (Di) corresponds to the third outer diameter (Df), wherein the inner diameter (Di) of the insulation is from 0.2 to 15 mm and/or the second outer diameter (Da) of the insulation is from 1 to 25 mm.

5. The sensor component of claim 1, wherein the insulation element comprises a glass ceramic material.

6. The sensor component of claim 5, wherein the glass ceramic material has a closed surface.

7. The sensor component of claim 5, wherein the glass ceramic material has a glassy surface without open pores.

8. The sensor component of claim 1, wherein the insulation element is a one-piece part made of a single material.

9. The sensor component of claim 1, wherein the insulation element is a one-piece part made from a plurality of single materials that are joined together to form a one-piece part.

10. The sensor component of claim 1, wherein the feedthrough element further comprises an outer threading, the outer threading providing the first outer diameter (D) with a dimension that is smaller than 14 mm.

11. The sensor component of claim 1, wherein the feedthrough element further comprises an outer threading, the outer threading is M14 or smaller.

12. The sensor component of claim 1, wherein the feedthrough element further comprises an outer threading, the outer threading is a range from M14 to M6.

13. The sensor component of claim 1, wherein the sensor component is sized and configured for a use selected from a group consisting of an electrical sensor component, electrochemical component, a combustion engine exhaust gas sensor, a lambda sensor, a NOx sensor, a particle matter sensor, a temperature sensor, a soot load sensor, and any combinations thereof.

* * * * *